United States Patent
Kurosawa et al.

(10) Patent No.: US 10,486,546 B2
(45) Date of Patent: Nov. 26, 2019

(54) TORQUE CONTROL METHOD AND TORQUE CONTROL DEVICE

(71) Applicant: NISSAN MOTOR CO., LTD., Yokohama-shi, Kanagawa (JP)

(72) Inventors: Takahisa Kurosawa, Atsugi (JP); Yohei Nakamura, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/317,181

(22) PCT Filed: Jul. 15, 2016

(86) PCT No.: PCT/JP2016/070955
§ 371 (c)(1),
(2) Date: Jan. 11, 2019

(87) PCT Pub. No.: WO2018/011968
PCT Pub. Date: Jan. 18, 2018

(65) Prior Publication Data
US 2019/0241075 A1    Aug. 8, 2019

(51) Int. Cl.
*B60L 15/20* (2006.01)

(52) U.S. Cl.
CPC ......... *B60L 15/20* (2013.01); *B60L 2240/421* (2013.01); *B60L 2240/423* (2013.01); *B60L 2250/26* (2013.01); *B60L 2260/24* (2013.01)

(58) Field of Classification Search
CPC .. B60L 5/20; B60L 2240/421; B60L 2250/26; B60L 2240/423; B60L 2260/24
USPC .......................................................... 701/22
See application file for complete search history.

(56) References Cited

U.S. PATENT DOCUMENTS

| 5,294,871 | A | * | 3/1994 | Imaseki | B60L 3/10 318/139 |
|---|---|---|---|---|---|
| 9,931,962 | B2 | * | 4/2018 | Suzuki | B60L 15/20 |
| 2014/0058605 | A1 | * | 2/2014 | Tagawa | B60W 10/06 701/22 |
| 2014/0316626 | A1 | | 10/2014 | Amano | |

FOREIGN PATENT DOCUMENTS

| JP | H05-168108 A | 7/1993 |
|---|---|---|
| JP | 2012-086772 A | 5/2012 |
| JP | 2012-116272 A | 6/2012 |
| WO | WO-2013/065167 A1 | 5/2013 |

OTHER PUBLICATIONS

International Search Report dated Sep. 27, 2016 for PCT/JP2016/070955, including English language translation.
International Preliminary Report on Patentability dated May 2, 2017 for PCT/JP2016/070955 [Japanese language].

* cited by examiner

*Primary Examiner* — Marthe Y Marc-Coleman
(74) *Attorney, Agent, or Firm* — Drinker Biddle & Reath LLP

(57) ABSTRACT

A torque control method for controlling torque of a motor, comprises detecting request of speed control requested from a driver by using a sensor, calculating a request torque based on the request, performing, controlling torque generated at the motor based on the request torque, when the request torque is smaller than a predetermined torque threshold value, a coast traveling control for setting the request torque to zero and controlling the motor based on the request torque which is set to zero.

8 Claims, 11 Drawing Sheets

TORQUE CONTROL METHOD AND TORQUE CONTROL DEVICE

TECHNICAL FIELD

The present invention relates to a torque control method and a torque control device.

BACKGROUND ART

Conventionally, an electric vehicle provided with an electric motor for traveling includes an accelerator sensor, a vehicle-speed sensor, and a controller for controlling torque of the electric motor for traveling. The controller calculates an average acceleration amount from an accelerator operation amount detected by the accelerator sensor, a target driving force of a drive wheel from vehicle speed, accelerator operation amount, and a map for driving, and a target torque of the electric motor for traveling from the target driving force and a transmission of a CVT. Then, the controller controls the electric motor for traveling so as to generate the target drive torque from the electric motor for traveling. (Patent Document 1).

PRIOR ART DOCUMENT

Patent Document

[Patent Document 1] JP 1993-168108 A

SUMMARY OF INVENTION

Problems to be Solved by Invention

However, in the above electric vehicle, when the motor is controlled to make an output torque of the motor a request torque in a state in which a request torque from a driver is small, there is a problem that driving efficiency of the vehicle becomes low.

Problems to be solved by the present invention is to provide a torque control method with higher driving efficiency of the motor and a torque control device.

Means for Solving Problems

In the present invention, the above problem is solved by calculating a request torque of the motor, setting the request torque to zero and controlling torque generated at the motor based on the request torque which is set to zero when the request torque is smaller than a predetermined torque threshold value.

Effect of Invention

According to the present invention, driving efficiency of the motor can be improved.

MODES FOR CARRYING OUT THE INVENTION

In the following, embodiments of the present invention will be described with reference to the drawings.

Figure 1:
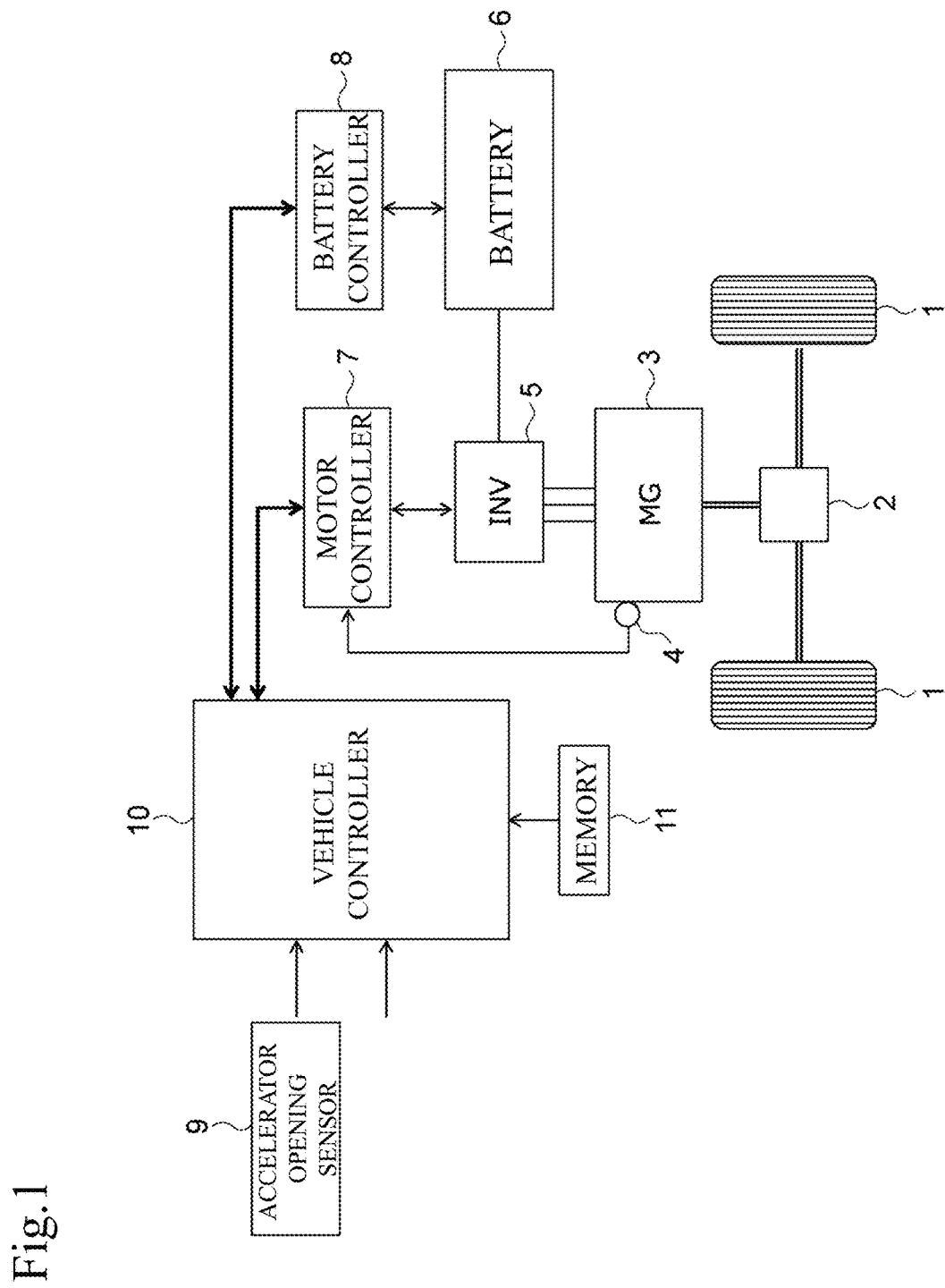
FIG. 1 is a block diagram of a vehicle system including a torque control device of the present embodiment according to the present invention.

FIG. 1 is a block diagram of a vehicle system provided with a torque control device according to the present embodiment. The torque control device according to the present embodiment is a device for controlling output torque of a drive mechanism included in a vehicle and is installed on the vehicle. In the following explanation, a case in which the torque control device is installed on an electric vehicle is used as an example. The torque control device is not necessarily installed on the electric vehicle, but may be installed on another vehicle such as a hybrid vehicle, or on a drive system other than vehicles.

As shown in FIG. 1, the vehicle system includes a drive wheel 1, a differential gear 2, a power generator (MG: motor) 3, a rotation speed sensor 4, an inverter (INV) 5, a battery 6, a motor controller 7, a battery controller 8, an accelerator-opening sensor 9, a vehicle controller 10, and a memory 11.

The drive wheel 1 rotates by the power output from the power generator 3. The differential gear 2 transmits the power from the power generator 3 to drive rates of right and left. The power generator 3 is a drive source of the vehicle system and is driven by the power of the battery. A rotary shaft of the power generator 3 is connected to an axle. During power running of the power generator 3, the torque generated at the power generator 3 is transmitted to the drive wheel 1 via an axle. During regeneration of the power generator 3, the power generator 3 generates power using rotational force of the drive wheel 1 and charges the battery 6 with the generated electric power.

The rotation speed sensor 4 detects rotation speed of the motor 3. The rotation speed sensor 4 outputs the detected value to the motor controller 7.

The inverter 5 is connected to the power generator 3 by three-phase wiring and connected to the battery 6 with a power line. The inverter 5 converts output power from the battery 6 to AC power and outputs the AC power to the power generator 3. Also, the inverter 5 converts the generated power of the power generator 3 to DC power and outputs the DC power to the battery 6. The inverter 5 includes a circuit or the like connecting a switching element (power module) such as an IGBT in a bridge form.

The battery 6 includes a secondary battery such as a lithium ion battery. The battery 6 functions as a power source of the vehicle system.

The motor controller 7 is a controller for controlling the power generator 3. The motor controller 7 controls the power generator 3 based on the request torque output from the vehicle controller 10 and the detected value by the rotations speed sensor 4. The motor controller 7 calculates rotation speed of the power generator 3 using the rotation speed sensor 4. The motor controller 7 calculates a command value for matching the output torque of the power generator 3 with the torque command value for the current rotation speed of the power generator 3. The command value is represented by a current command value or the like. In order to match the output torque of the power generator 3 with the torque command value, the motor controller 7 feedbacks the detected value of the current sensor (not shown in the drawings), and calculates a command value by PI control. The motor controller 7 generates a switching signal by comparing the calculated command value and a carrier and outputs the switching signal to the inverter 5. The switching signal is a signal for switching ON and OFF of the switching element included to the inverter 5. In this way, the motor controller 7 controls the torque generated at the power generator 3 based on the request torque (the request torque for control) output from the vehicle controller 10.

The battery controller 8 is a controller for managing a state of the battery 6. The battery controller 8 manages the battery 6 by calculating a state of charge (SOC) using a voltage sensor (not shown in the drawings) connected to the battery 6. The battery controller 8 outputs a signal indicating the state of the battery 6 to the vehicle controller 10.

Between the motor controller 7 and vehicle controller 10, and between the motor controller 7 and vehicle controller 10 are connected with CAN bus. CAN bus is a communication network connecting between each controller installed on the vehicle.

An accelerator-opening sensor 9 detects opening of the accelerator. A driver steps on the accelerator to accelerate the vehicle. A step-on amount of the accelerator pedal corresponds to the magnitude of acceleration that the driver requests. In other words, the accelerator opening represents a request value for the speed control from the driver. The accelerator-opening sensor 9 outputs the detected accelerator opening (APO) to the vehicle controller 10.

The vehicle controller 10 is a controller for controlling the entire vehicle system. The vehicle controller 10 obtains accelerator information and traveling mode information using hardware such as a sensor. The vehicle controller 10 obtains accelerator information by detecting accelerator opening using the accelerator-opening sensor 9.

The traveling mode represents a control method of the vehicle system. The traveling mode is classified into a plurality of modes in correspondence with an energy consumption rate of the vehicle and the energy consumption amount relative to the accelerator opening varies depending on the traveling mode. In an electric vehicle, the energy consumption amount corresponds to the consumption power of the battery 6. In the present embodiment, the traveling mode is classified to an economy mode, regular mode, and sport mode. Also, the driver selects a traveling mode by switching a switch in the vehicle cabin. In the economy mode, the energy consumption amount relative to the accelerator opening is suppressed the most. In the sport mode, the energy consumption amount relative to the accelerator opening becomes the maximum and operability of acceleration becomes high. In the regular mode, acceleration performance and reduction of the energy consumption amount are both achieved. The magnitude and variation of the generation torque of the power generator 3 relative to the acceleration request by the driver becomes the minimum in the economy mode and maximum in the sport mode. The vehicle controller 10 obtains information of the traveling mode by detecting a state of the switch for selecting the traveling mode.

The vehicle controller 10 obtains information of the battery 6 from the battery controller 8 and obtains information indicating the traveling state of the vehicle from the motor controller 7. The information indicating the traveling state of the vehicle is, for example, vehicle speed information.

The vehicle controller 10 detects a request of speed control from the driver using the accelerator-opening sensor 9 and calculates a request torque based on the detected request and the state of the vehicle. The request torque is indicated by the magnitude of the generation torque of the power generator 3 to represent a speed control request from the driver. The vehicle controller 10 calculates a request torque using a driving force map stored in the memory 11.

Figure 2:
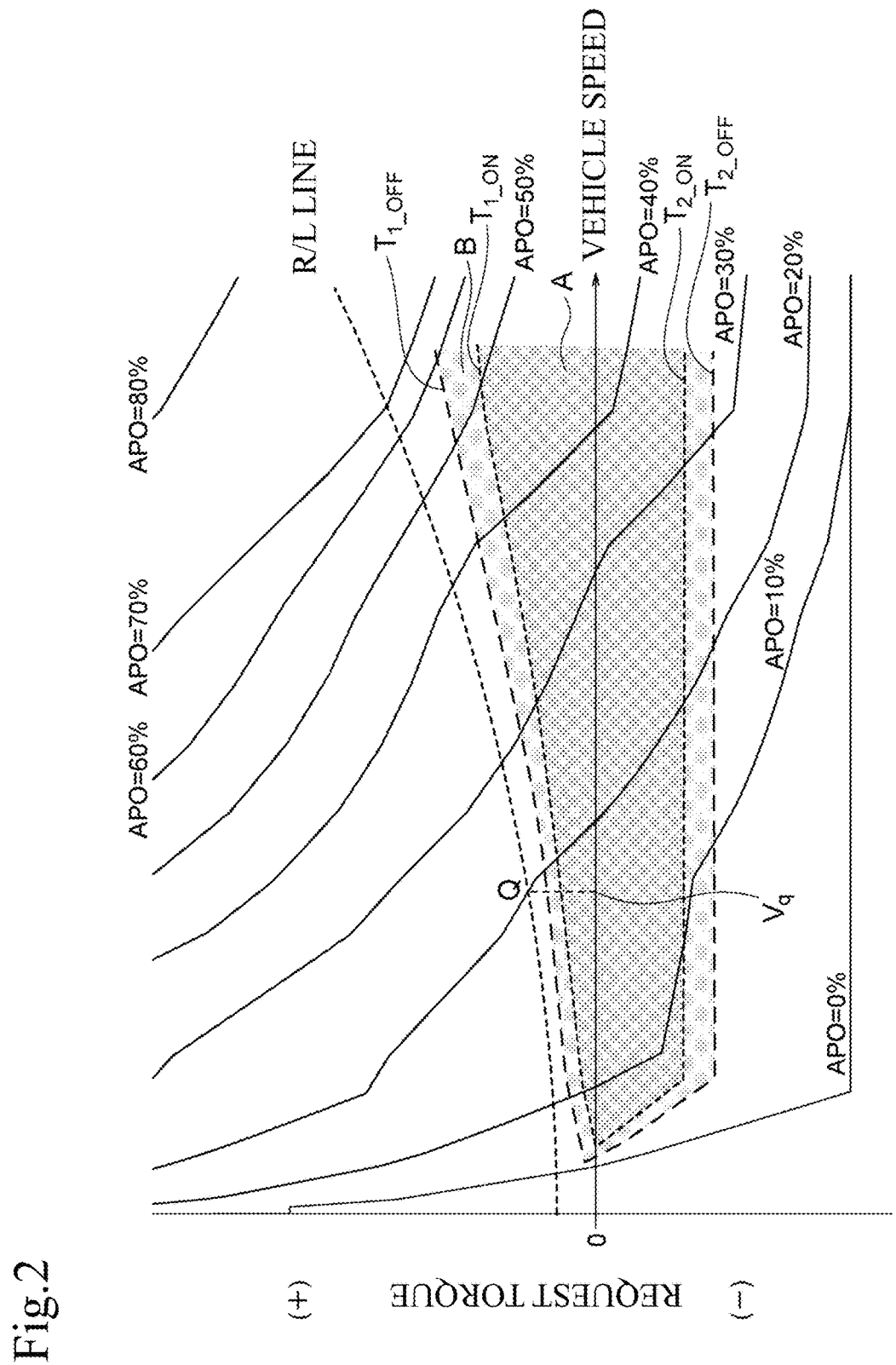
FIG. 2 is a diagram illustrating an example of a driving force map.

FIG. 2 is a graph for explaining the driving force map. As shown in FIG. 2, the driving force map indicates a relative relationship between vehicle speed, an accelerator opening (APO), and request torque. In FIG. 2, a graph shown in a solid line represents characteristics of the request torque relative to vehicle speed and each characteristic varies by accelerator opening. When a vehicle is traveling at a certain vehicle speed, and when there is a request of vehicle control (accelerator operation) from the driver, a graph that corresponds to the accelerator opening is selected, and on the selected graph, the request torque that corresponds to the current vehicle speed becomes the requested driving force for the power generator 3. In FIG. 2, a positive value of the driving force represents an output torque for the power running side (the driving force of the power generator 3), and a negative value of the driving force represents an input torque for the regeneration side (the braking force of the power generator 3).

In FIG. 2, area A and area B represent an area in which coast traveling control is performed. Graph R illustrates a characteristic of the traveling resistance line (R/L line). The traveling resistance line indicates the torque required in order to maintain a certain vehicle speed and is experimentally determined. $T_{1\_ON}$, $T_{2\_ON}$, $T_{1\_OFF}$ and $T_{2\_OFF}$ are threshold values represented in torque indicating timings of switching the control mode between an ordinary control and coast traveling control and are set in advance. $T_{1\_ON}$ and $T_{2\_ON}$ represent threshold values for switching between the ordinary control and coast traveling control. $T_{1\_OFF}$ and $T_{2\_OFF}$ represent threshold values for switching from the coast travelling control to the ordinary control. $T_{1\_ON}$ and $T_{1\_OFF}$ represent threshold values for the power running side and $T_{2\_ON}$ and $T_{2\_OFF}$ represent threshold values for the regeneration side. As to the ordinary control, coast traveling control, and torque threshold values ($T_{1\_ON}$, $T_{2\_ON}$, $T_{1\_OFF}$, and $T_{2\_OFF}$), they will be described later.

The vehicle controller 10 obtains motor rotation speed from the motor controller 7 and calculates vehicle speed (the vehicle speed for control). The vehicle speed is calculated from the motor rotation speed, gear ratio, and wheel radius of the drive wheel 1. In other words, the vehicle speed for control corresponds to the motor rotation speed. Further, the vehicle controller 10 calculates torque that corresponds to an accelerator opening and vehicle speed as a request torque from the driver while referencing the driving force map described above. The vehicle controller 10 outputs the calculated request torque to the motor controller 7. As described in the following, in the ordinary control, the vehicle controller 10 outputs the torque indicated in the driving force map to the motor controller 7 as the request torque for control without correction. Whereas, in the coast traveling control, the vehicle controller 10 first corrects the torque indicated on the driving force map to zero and then outputs the torque after correction (zero torque) to the motor controller 7 as the request torque for control.

Figure 3:
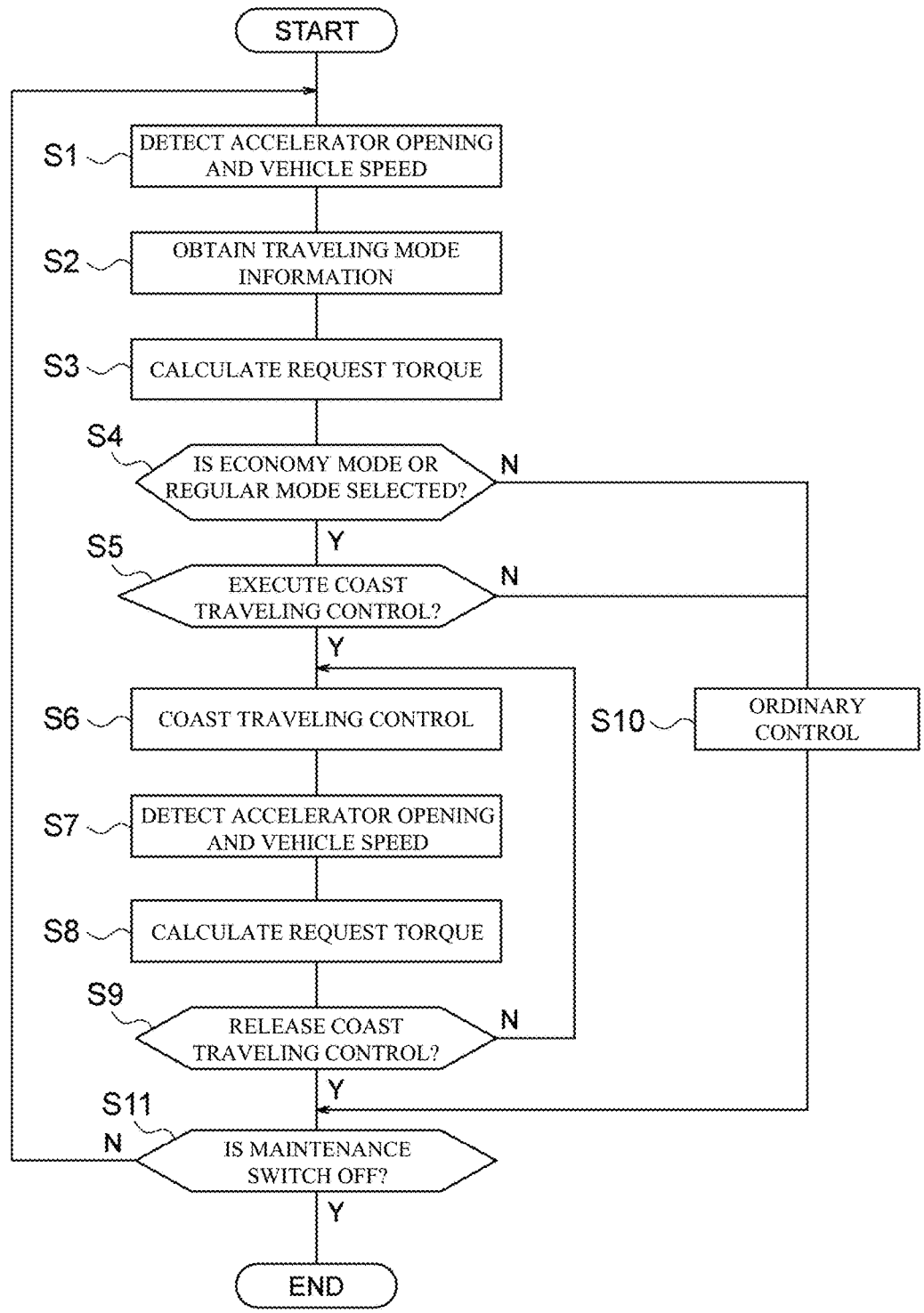
FIG. 3 is a flowchart illustrating a control flow of the torque control method according to the present embodiment.

Next, using FIG. 3, a method of torque control by a torque control device according to the present embodiment will be explained. FIG. 3 is a flowchart illustrating a control flow of the motor controller 7 and vehicle controller 10. When the main switch is turned ON by a driver, the control flow shown in FIG. 3 starts. The main switch switches ON and OFF of the vehicle system.

In step S1, the vehicle controller 10 detects a present accelerator opening using an accelerator-opening sensor 9. The vehicle controller 10 obtains motor rotation speed by obtaining a detected value of the rotation speed sensor 4 via the motor controller 7, and then calculates vehicle speed based on the obtained motor rotation speed. In this way, the vehicle controller 10 detects the vehicle speed.

In step S2, the vehicle controller 10 obtains traveling mode information.

In step S3, the vehicle controller 10 references a driving force map and calculates request torque that corresponds to the accelerator opening and vehicle speed.

In step S4, the vehicle controller 10 determines whether or not the traveling mode is in the economy mode or regular mode. When the traveling mode is in the economy mode, or when the traveling mode is in the regular mode, the control flow proceeds to step S5. Whereas, when the traveling mode is in the sport mode, the control flow proceeds to step S10. In other words, although coast traveling control described in the following is executed under the economy mode and regular mode, the coast raveling control is not executed under the sport mode.

In step S5, the vehicle controller 10 compares the calculated request torque and torque threshold values ($T_{1\_ON}$ and $T_{2\_ON}$) and determines whether or not to execute the coast traveling control based on the comparison result. The vehicle controller 10 determines whether or not the request torque is within a torque range shown by area A. Area A is a range surrounded by the torque threshold values ($T_{1\_ON}$ and $T_{2\_ON}$) on the driving force map. When the request torque is within the range of area A, the vehicle controller 10 determines to execute the coast traveling control. The control flow proceeds to step S6. On the other hand, when the request torque is outside the range of area A, the vehicle controller 10 determines not to execute the coast traveling control. The control flow proceeds to step S11.

Determining of whether or not the request torque is within the rage of area A is performed by comparing the request torque and the torque threshold values ($T_{1\_ON}$ and $T_{2\_ON}$) as shown in the following. When the calculated request torque is the torque of the power running side and when the request torque is smaller than the torque threshold value ($T_{1\_ON}$), the vehicle controller 10 determines to execute the coast traveling control. When the calculated request torque is the torque of the power running side and when the request torque is equal to or greater than the torque threshold value ($T_{1\_ON}$), the vehicle controller 10 determines not to execute the coast traveling control. When the calculated request torque is the torque of the regeneration side and when the request torque is smaller than the torque threshold value ($T_{2\_ON}$), the vehicle controller 10 determines to execute the coast traveling control. When the calculated request torque is the torque of the regeneration side and when the request torque is equal to or greater than the torque threshold value ($T_{2\_ON}$), the vehicle controller 10 determines not to execute the coast traveling control. Further, as shown in FIG. 2, when the request torque of the regeneration side is indicated with a negative value, the torque threshold value ($T_{2\_ON}$) is set to a negative torque value and when "request torque>torque threshold value ($T_{2\_ON}$)" is satisfied, the vehicle controller 10 determines to execute the coast traveling control.

In step S6, the vehicle controller 10 executes the coast traveling control. In the coast traveling control, when the request torque from the driver is within area A, the request torque for control is set to zero and the power generator 3 is controlled so that the set request torque becomes the generation torque of the power generator 3. In other words, when the request torque is smaller than the torque threshold values ($T_{1\_ON}$ and $T_{2\_ON}$), the vehicle controller 10 controls the power generator 3 by lowering the request torque for controlling the power generator 3 (corresponds to the torque command value) lower than the actual request from the driver.

When the request torque from the driver is small and the power generator 3 generates an exact torque as requested by the driver, consumed power by the electric system such as an inverter 5 becomes relatively greater than the drive power of the power generator 3. Thus, when the power generator 3 is driven as requested by the driver, driving efficiency becomes low. Also, when the length of traveling time under a state in which the request torque is small accumulates, the length of drive time under a low-efficiency state becomes long, and, as a result, it may cause cruising distance of the vehicle to become short.

In the torque control device in the present embodiment, when the request torque from the driver is within area A, the request torque for the control is set to zero and the power generator 3 is controlled so as to make the set request torque become the generation torque of the power generator 3. Accordingly, the generation torque of the power generator 3 becomes lower than the torque as requested by the driver and thus the power generator 3 is prevented from driving under a low-efficiency state and the driving efficiency can be improved.

In step S7, the vehicle controller 10 detects an accelerator opening and vehicle speed. In step S8, the vehicle controller 10 calculates a request torque. The control flow of step S7 and step S8 is a control flow similar to step S1 and step S3. In other words, the vehicle controller 10 detects the accelerator opening and vehicle speed even during the coast traveling control and calculates the request torque from the driver.

In step S9, the vehicle controller 10 compares the calculated request torque and torque threshold values ($T_{1\_OFF}$ and $T_{2\_OFF}$) and determines whether or not to release the coast traveling control based on the comparison result. The vehicle controller 10 determines whether or not the request torque is within the torque range shown as area B. Area B is a range surrounded by the torque threshold values ($T_{1\_OFF}$ and $T_{2\_OFF}$) on the driving force map. When the request torque is within the range of area B, the vehicle controller 10 determines to continue the coast traveling control. The control flow returns to step S6. On the other hand, when the request torque is outside the range of area B, the vehicle controller 10 determines to release the coast traveling control. The control flow proceeds to step S11.

Judgment of whether or not the request torque is within the range of area B is performed by comparing the request torque and torque threshold values ($T_{1\_OFF}$ and $T_{2\_OFF}$) as described below. When the calculated request torque is the torque of the power running side and when the request torque is smaller than the torque threshold value ($T_{1\_OFF}$), the vehicle controller 10 determines not to release the coast traveling control. When the calculated request torque is the torque of the power running side and when the request torque is equal to or greater than the torque threshold value ($T_{1\_OFF}$), the vehicle controller 10 determines to release the coast traveling control. When the calculated request torque is the torque of the regeneration side and when the request torque is smaller than the torque threshold value ($T_{2\_OFF}$), the vehicle controller 10 determines not to release the coast traveling control. When the calculated request torque is the torque of the regeneration side and when the request torque is equal to or greater than the torque threshold value ($T_{2\_OFF}$), the vehicle controller 10 determines to release the coast traveling control. Additionally, as shown in FIG. 2, when the request torque of the regeneration side is indicated in a negative value, the torque threshold value ($T_{2\_OFF}$) is set to a negative torque value, and when "request torque>torque threshold value ($T_{2\_OFF}$)" is satisfied, the vehicle controller 10 determines to release the coast traveling control.

In step S5, when determining not to execute the coast traveling control, the vehicle controller 10 executes ordinary control in step S11. In the ordinary control, the vehicle controller 10 controls the power generator 3 so that the request torque calculated on the driving force map becomes the generation torque of the power generator 3.

In step S11, the vehicle controller 10 determines whether or not the main switch is in the OFF state. When the main switch is in the ON state, the control flow returns to step S1. When the main switch is in the OFF state, the control flow ends.

Figure 4:
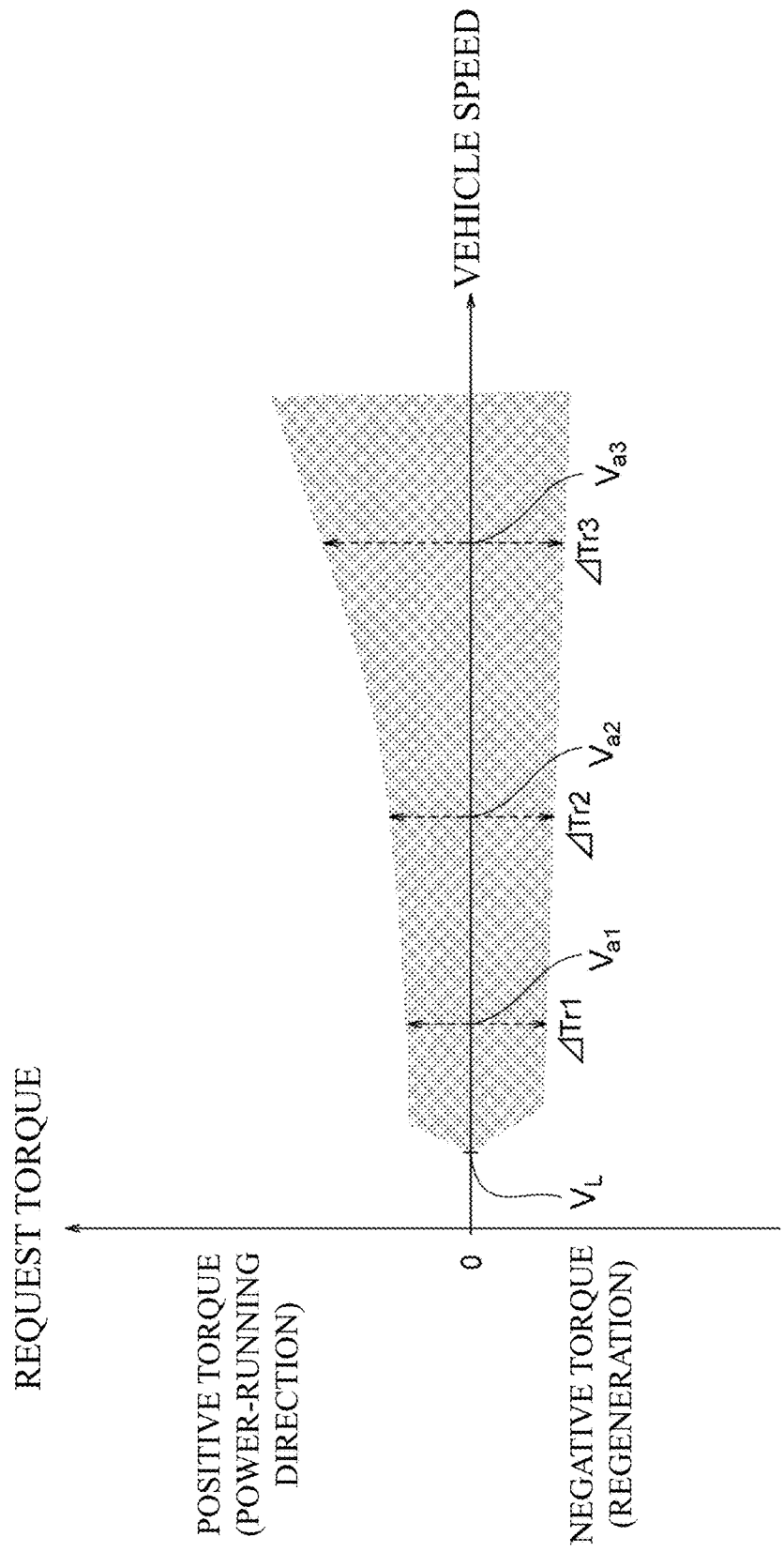
FIG. 4 is a diagram illustrating surrounding parts of area A in the driving force map shown in FIG. 2.

The relationship between the request torque and coast traveling control will be described using FIG. 4. FIG. 4 is a graph illustrating surrounding parts of area A in the driving force map shown in FIG. 2.

As shown in FIG. 4, as the vehicle speed of the vehicle increase, the torque threshold value ($T_{1\_ON}$) of the power running side becomes larger. Whereas, the torque threshold value ($T_{2\_ON}$) of the regeneration side is almost stable despite the vehicle speed. In other words, when torque differences at any vehicle speed within area A ($V_{a1}$, $V_{a2}$, $V_{a3}$: wherein, $V_{a1}<V_{a2}<V_{a3}$) are considered as $\Delta Tr_1$, $\Delta Tr_2$, and $\Delta Tr_3$, $\Delta Tr_3$ becomes the greatest and $\Delta Tr_1$ becomes the smallest among torque differences ($\Delta Tr_1$, $\Delta Tr_2$, and $\Delta Tr_3$). The torque differences ($\Delta Tr_1$, $\Delta Tr_2$, and $\Delta Tr_3$) indicate a range in which coast traveling control is executed relative to a certain vehicle speed. That is, as the vehicle speed increases, an execution range for the coast traveling control becomes wider.

Compared to a case in which the motor rotation speed is slow, consumed power by the electric system such as the inverter 5 becomes greater relative to the consumption power required to drive the power generator 3 when the motor rotation speed is fast. Generally, when the motor rotation speed is fast, in order to suppress counter-electromotive force generated at the power generator 3, the inverter 5 is controlled in a field-weakening control method. However, when the inverter is controlled in the field-weakening control method, the consumption power of the inverter becomes greater than the ordinary inverter control. In the present embodiment, the torque threshold value is set so as to set execution range of the coast traveling control wider as the vehicle speed increases. When the request torque from the driver is small in a state in which the motor rotation speed is fast, because the coast traveling control is executed, drive control such that the power generator 3 outputs torque under high rotation can be prevented. As a result, inefficient driving of the power generator 3 can be suppressed.

Further, the torque threshold value ($T_{2\_ON}$) of the regeneration side is set to a value that is almost constant despite the vehicle speed. Unlike the present embodiment, when the torque threshold value ($T_{2\_ON}$) of the regeneration side changes according to the vehicle speed, the regeneration torque also changes in relation to the vehicle speed, and thus deceleration of the vehicle is changed depending on the vehicle speed. In other words, deceleration when the accelerator opening became zero while the vehicle is traveling at high speed and, deceleration when the accelerator opening became zero while the vehicle is traveling at low speed become different. Also, due to this difference in deceleration, the driver has no idea what the size of the deceleration for the present state of the vehicle would be and feels discomfort in driving. In the present embodiment, since the torque threshold value ($T_{2\_ON}$) of the regeneration side is set to a constant value despite the vehicle speed, uncomfortable feeling of the driver can be suppressed.

More, as shown in FIG. 4, area A is set to a range in which the vehicle speed becomes at least a lower limit value $V_L$ or greater. In other words, when the vehicle speed is the lower limit value $V_L$ or greater, the coast traveling control is executed according to the magnitude of the requested torque. Whereas, when the vehicle speed is lower than the lower limit value $V_L$, the coast traveling control is not executed regardless of the magnitude of the request torque. That is, in a drive area in which the vehicle speed becomes lower than the lower limit value $V_L$, for example, when parking the car to a parking space, situations of requesting a small torque increases. Accordingly, in the present embodiment, the vehicle controller 10 does not execute the coast traveling control when the motor rotation speed is lower than a predetermined rotation speed threshold value. In this way, in a traveling situation in which small torque is requested, an exact torque as requested by the driver can be output. The predetermined rotation speed threshold value is a threshold value that corresponds to the lower limit value ($V_L$) of the vehicle speed.

Further, as shown in FIG. 2, the torque threshold value ($T_{1\_OFF}$) is set to a value greater than a torque threshold value ($T_{1\_ON}$). More, the torque threshold value ($T_{2\_OFF}$) is set to a value greater (a value greater in the negative direction) than a torque threshold value ($T_{2\_ON}$). In this way, a phenomenon in which the control mode frequently switches between the ordinary control and coast traveling control (hunting) can be prevented.

Also, as shown in FIG. 2, the torque threshold value ($T_{1\_ON}$) is set to a value lower than the torque indicated by the characteristic of the traveling resistance line (R/L line). The torque indicated by the characteristic of the traveling resistance line (R/L line) is the torque required to maintain the vehicle speed constant. For example, in the map shown in FIG. 2, suppose that the driver steps the accelerator and accelerated the vehicle with 20% accelerator opening from the state in which the vehicle is stopped. When the vehicle speed increases while maintaining the state of the accelerator opening to 20%, the request torque decreases along with the graph of the 20% accelerator opening in the driving force map. Then, when the request torque reaches an intersection point Q, the driving force and traveling resistance become a balanced state and the vehicle speed becomes a constant speed (Vq). The intersection point Q is a point at which the graph of 20% accelerator opening and traveling resistance line (R/L line) intersect. The torque threshold value ($T_{1\_ON}$) that corresponds to the speed Vq is set to a value that is lower than the torque indicated by the intersection point Q. Also, for speeds other than the speed Vq, the torque threshold value ($T_{1\_ON}$) is set to a value that is lower than the torque indicated by the characteristic of the traveling resistance line (R/L line).

In order to raise the vehicle speed, the vehicle controller 10 needs to execute an ordinary control and the request torque for control becomes equal to the request torque from the driver (the torque of the acceleration request). Whereas, by decreasing the request torque, the vehicle controller 10 needs to execute coast traveling control when reduction of the vehicle speed is required, and thus the request torque for control is set to zero. In this way, when reduction of the vehicle speed is required by decreasing the request torque while responding to the acceleration request from the driver, driving of the power generator 3 at low-efficiency can be prevented and the driving efficiency can be improved.

Figure 5:
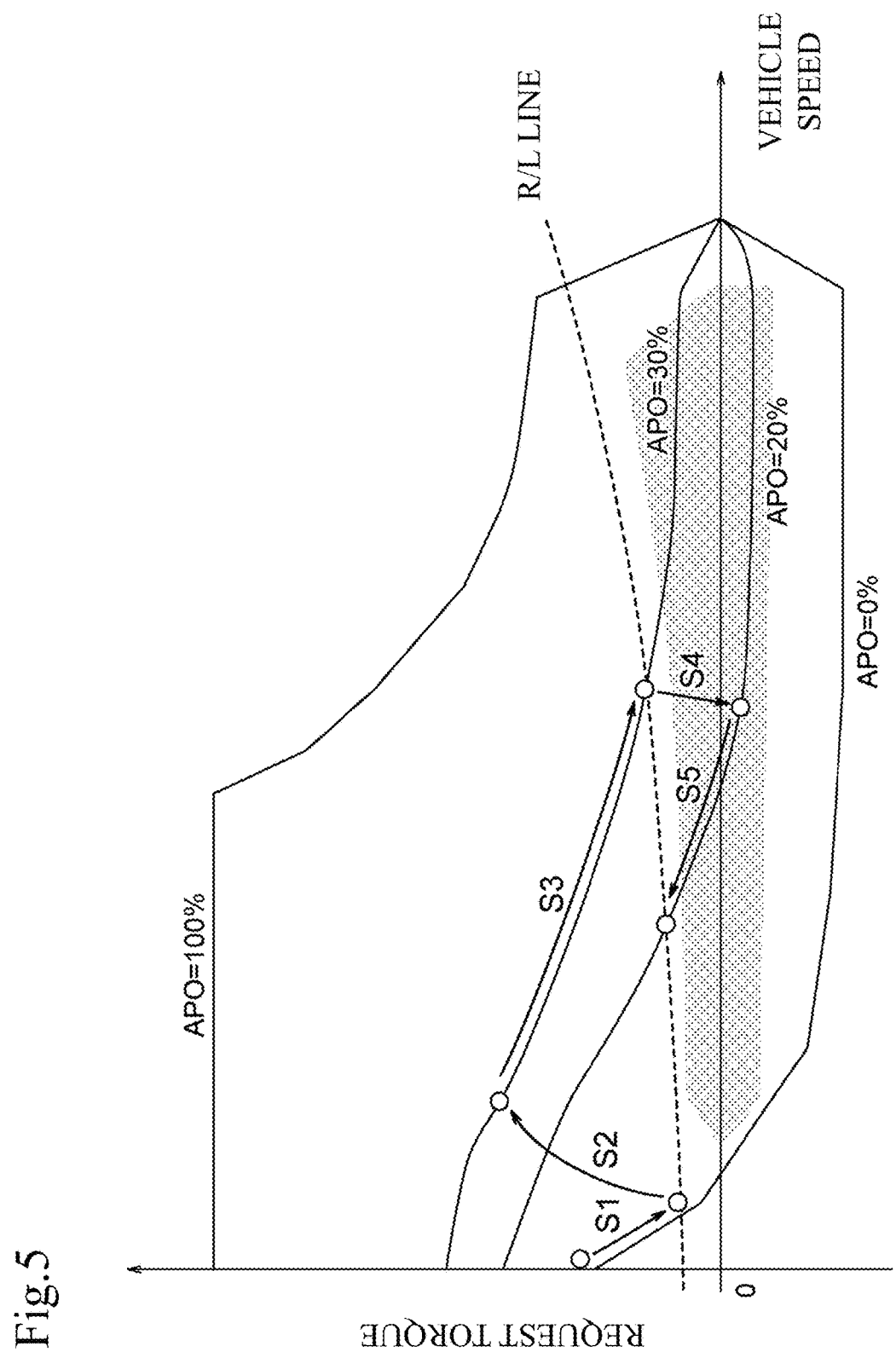
FIG. 5 is a diagram illustrating transitions of the torque and vehicle speed by step in the driving force map shown in FIG. 2.

Next, using FIG. 5, while providing an actual vehicle operation as an example, switching between the ordinary control and coast traveling control will be explained. FIG. 5 is a graph showing surrounding parts of area A in the driving force map illustrated in FIG. 2. For convenience of explanation, the values used for the torque threshold value ($T_{1\_ON}$) and torque threshold value ($T_{1\_OFF}$) are the same. More, "S1" to "S5" shown in FIG. 5 correspond to step S1 to step S5 in the following explanation respectively.

In step S1, from the state in which the vehicle is stopped, when the brake pedal becomes an off state, creep traveling starts.

In step S2, the driver steps on the accelerator and acceleration starts with a 30% accelerator opening.

In step S3, by stepping the accelerator pedal and generating an allowance drive force, acceleration continues. When the driving force and traveling resistance become balanced, the vehicle speed becomes a constant speed.

In step S4, from the state in which the driving force and traveling resistance are balanced, as a request of speed reduction from the driver, the driver slightly releases the accelerator and the accelerator opening changes from 30% to 20%. At this timing of releasing the accelerator slightly (an accelerator release timing), the request torque from the driver becomes smaller than the torque threshold value ($T_{1\_ON}$), and the control mode of the power generator 3 switches from the ordinary control to the coast traveling control. Then, when the coast traveling control starts, the request torque for control is set to zero.

In step S5, when the accelerator opening is maintained at 20%, the request torque calculated on the driving force map becomes equal to or greater than the torque threshold value ($T_{1\_OFF}$), and thus the control mode of the power generator 3 switches form the coast traveling control to the ordinary control. More, the request torque changes along with the graph of 20% accelerator opening, and when the driving force and traveling resistance become balanced, the vehicle speed becomes a constant speed.

As mentioned above, when the control mode switches from the ordinary control to the coast traveling control, the value of the request torque for control changes from the torque value calculated on the driving force map to zero. At this time, when the request torque for control is changed discontinuously, variation in the driving force (braking force in case of regeneration) becomes great and leads to give uncomfortable feeling to the driver. For this reason, in the present embodiment, in order to prevent such uncomfortable feeling, a torque-rate limiter is set.

Figure 6:
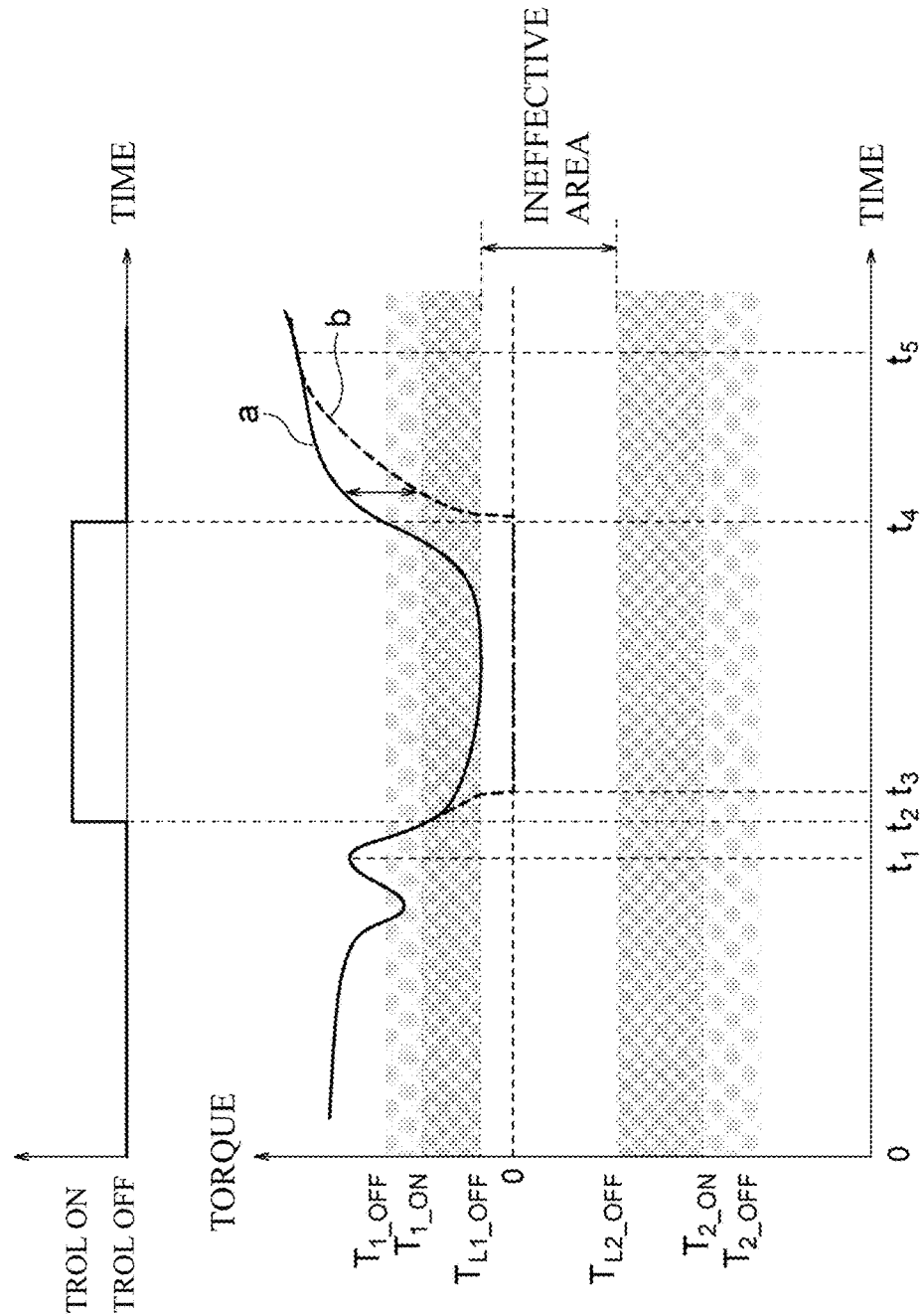
FIG. 6 is a graph illustrating a time chart for ON and OFF of a coast traveling control and torque characteristics.
Figure 7:
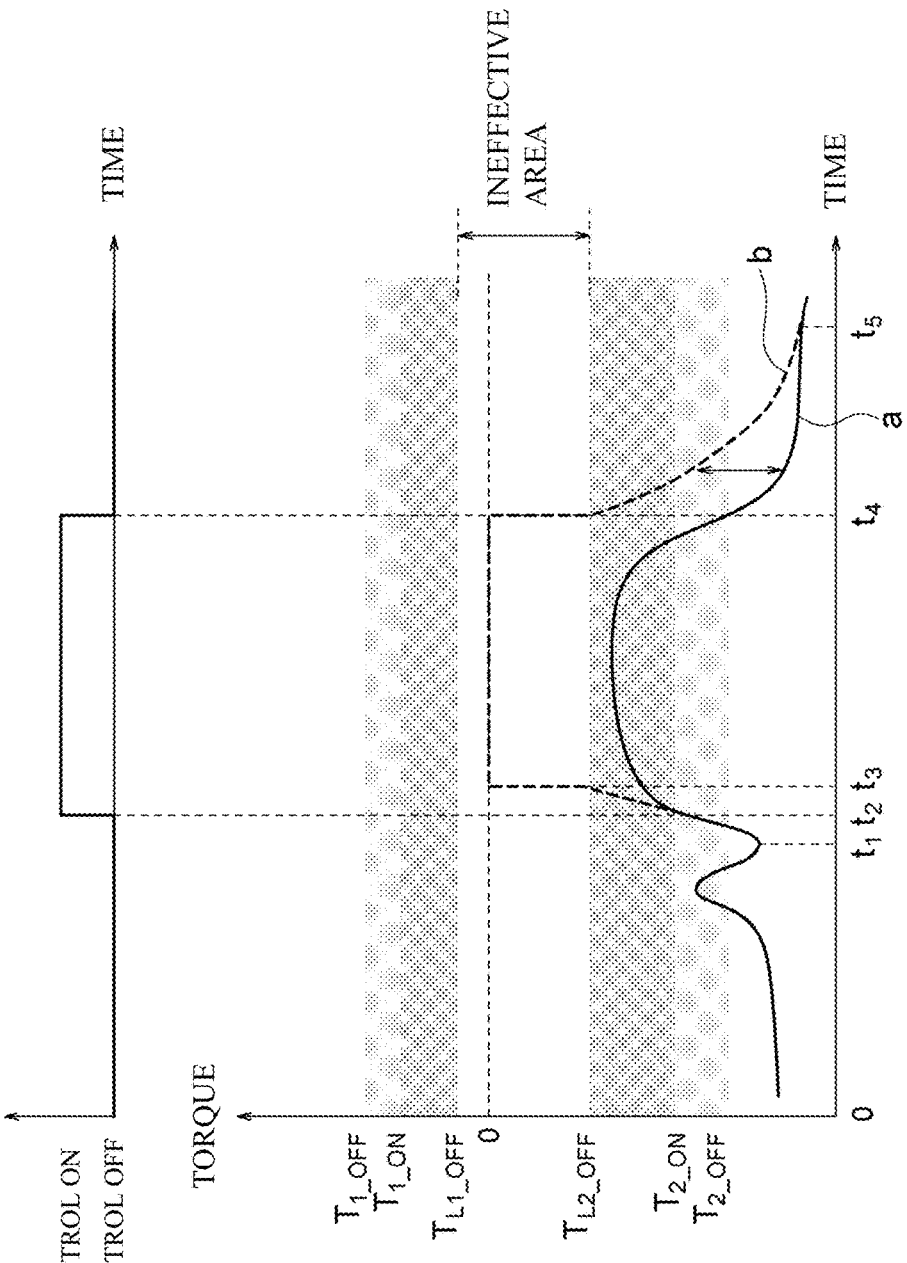
FIG. 7 is a graph illustrating a time chart for ON and OFF of the coast traveling control and torque characteristics.

In the following, the torque-rate limiter is described using FIG. 6 and FIG. 7. FIG. 6 and FIG. 7 are graphs showing an ON and OFF time chart and torque characteristics of the coast traveling control. FIG. 6 shows the characteristics of the power running side and FIG. 7 shows characteristics on the regeneration side. In FIG. 6 and FIG. 7, graph a illustrates a request torque calculated using the driving force map and graph b illustrates the request torque for control. Also, the torque variation shown with graph a corresponds to the accelerator operation.

Between time 0 and time $t_1$, since the request torque changes in a range larger than the torque threshold value ($T_{1\_ON}$) by accelerator operation, the control mode of the power generator 3 becomes the ordinary control.

While the vehicle is traveling, when the driver operates to release the accelerator at time $t_1$, the request torque lowers. The driving force of the power generator 3 lowers so as to match with the request torque from the driver.

At time $t_2$, the request torque from the driver becomes smaller than the torque threshold value ($T_{1\_ON}$), and the control mode of the power generator 3 switches from the ordinary control to the coast traveling control. At this time, when the power generator 3 is controlled to make the driving force zero, a rapid torque change is generated and may give uncomfortable feeling (rebounding to drivability) to the driver. For this reason, by making the torque-rate limiter active for the period between time $t_2$ and time $t_3$ the torque change amount is kept low.

Between time $t_2$ and time $t_3$, the vehicle controller 10 calculates a change amount of the accelerator opening and sets a change amount of the torque according to the calculated change amount of the accelerator opening. The change amount of the torque is the change amount until the request torque for control at time $t_2$ changes to zero. The vehicle controller 10 calculates the torque change amount so as to make the change amount of the torque to become greater as the change amount of the accelerator opening (corresponds to the accelerator operation amount) increases. The vehicle controller 10 corrects the request torque for control so that the request torque for control changes by the calculated torque change amount and outputs the corrected request torque for control to the motor controller 7. In this way, the length of torque change time becomes shorter as the change amount of the torque increases, and the length of torque change time becomes longer as the change amount of the torque decreases. The torque change time is the length of time until the value of the driving force changes from the request torque value on the driving force map to zero, and is the time between time $t_2$ and time $t_3$ shown in FIG. 6 and FIG. 7.

At time $t_3$, when the torque for control becomes smaller than the torque threshold value ($T_{L1\_OFF}$), the vehicle controller 10 releases the torque-rate limiter. The torque threshold value ($T_{L1\_OFF}$) indicates the upper limit value of the ineffective area of the torque-rate limiter. The ineffective area of the torque-rate limiter indicates range in which the torque for control is set to zero without making any limitation to the torque variation. The ineffective area is a range between the upper limit value ($T_{L1\_OFF}$) and lower limit value ($T_{L2\_OFF}$) while including zero torque. When the driving force becomes near zero, even when the torque for control is changed to zero, influence on driving is small since the change amount in acceleration is small. For this reason, when the torque for control is smaller than the torque threshold value ($T_{L1\_OFF}$), the vehicle controller 10 releases the limitation to the torque variation and sets the torque for control to zero. In this way, the length of coast traveling time can be extended. The coast traveling time is the length of time at which the driving force (or braking force) becomes zero and is the length of time between time $t_3$ and time $t_4$ shown in FIG. 6 and FIG. 7.

When the request torque from the driver becomes large and the request torque becomes greater than the torque threshold value ($T_{1\_OFF}$) at time $t_4$, the control mode of the power generator 3 switches from the coast traveling control to the ordinary control. When the torque for control becomes greater than the torque threshold value ($T_{L1\_OFF}$), the vehicle controller 10 activates the torque-rate limiter.

Between time $t_4$ and time $t_5$, the vehicle controller 10 calculates a change amount of the accelerator opening and sets the change amount of torque according to the calculated change amount of the accelerator opening. The vehicle controller 10 corrects the request torque for control so that the request torque for control change by the torque change amount and outputs the corrected request torque for control to the motor controller 7. Then, at time $t_5$, the request torque from the driver and request torque for control becomes equal.

The change amount of the accelerator opening before and after time $t_4$ is smaller than the change amount of the accelerator opening before and after time $t_2$. For this reason, the torque change amount calculated during the period between time $t_4$ and time $t_5$ is smaller than the torque change amount calculated during the period between time $t_2$ and time $t_3$. When the accelerator operation amount is small, the driver feels uncomfortable to the small torque change. In the present embodiment, in order to prevent such uncomfortable feeling, the length of torque change time is made longer by making the torque change amount small.

Unlike the example in FIG. 6, when the change amount of the accelerator opening before and after time $t_4$ is greater than the change amount of the accelerator opening before and after time $t_2$, the torque change amount calculated between time $t_4$ and time $t_5$ is greater than the torque change amount calculated between time $t_2$ and time $t_3$. When the accelerator operation amount is large, since uncomfortable feeling is hardly generated to the torque change, the torque change amount is increased to make the torque change time short. In this way, the length of response time from the torque request to the torque output is shortened and control without delay in response to the accelerator operation can be performed.

Next, using FIG. 7, torque-rate limiter for regeneration will be explained.

As the request torque changes in an area greater than the torque threshold value ($T_{2\_ON}$) in the period between time 0 and time $t_1$, the control mode of the power generator 3 is the ordinary control. At time $t_1$, the request torque of the regeneration side lowers.

At time $t_2$, the request torque from the driver becomes smaller than the torque threshold value ($T_{2\_ON}$), and the control mode of the power generator 3 switches from the ordinary control to the coast traveling control. At this time, as in the power running side described above, the vehicle controller 10 activates the torque-rate limiter and calculates the request torque for control.

Between time $t_2$ and time $t_3$, the vehicle controller 10 calculates a change amount of the accelerator opening and sets the change amount for torque according to the calculated change amount of the accelerator opening. The vehicle controller 10 corrects the request torque for control so as to change the request torque for control by the set torque change amount and outputs the corrected request torque for control to the motor controller 7.

When the request torque of the regeneration side becomes large and the request torque at time $t_4$ becomes greater than the torque threshold value ($T_{2\_OFF}$), the control mode of the power generator 3 switches from the coast traveling control to the ordinary control. When the torque for control becomes greater than the torque threshold value ($T_{L2\_OFF}$), the vehicle controller 10 activates the torque-rate limiter.

Between time $t_4$ and time $t_5$, the vehicle controller 10 calculates a change amount of the accelerator opening and sets the change amount of torque according to the calculated change amount of the accelerator opening. The vehicle controller 10 calculates the request torque for control so as to make the request torque for control change by the set torque change amount and outputs the calculated request torque for control to the motor controller 7. Then, at time $t_5$, the request torque from the driver and request torque for control becomes equal.

Figure 8:
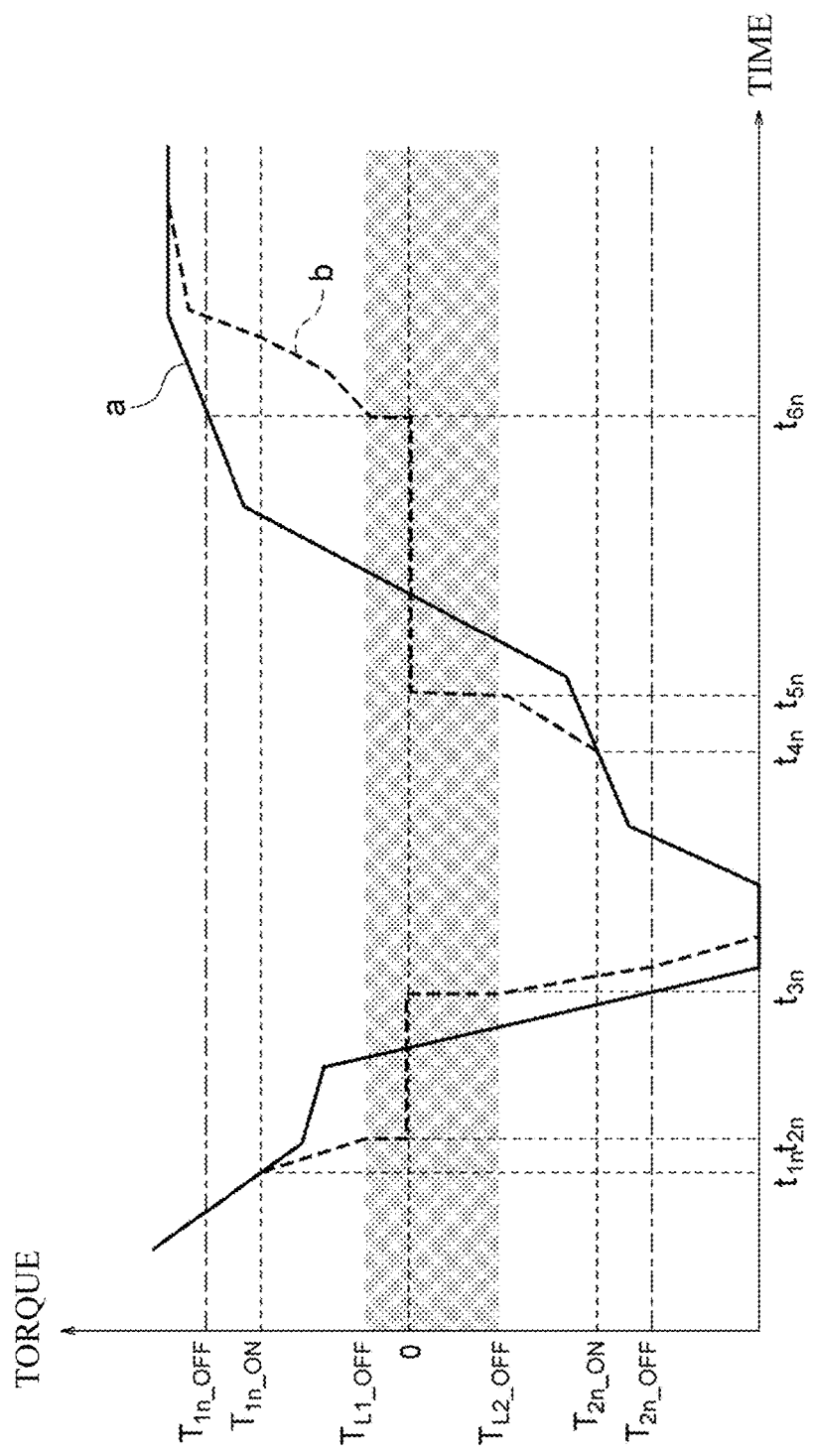
FIG. 8 is a graph illustrating torque characteristics of a regular mode.
Figure 9:
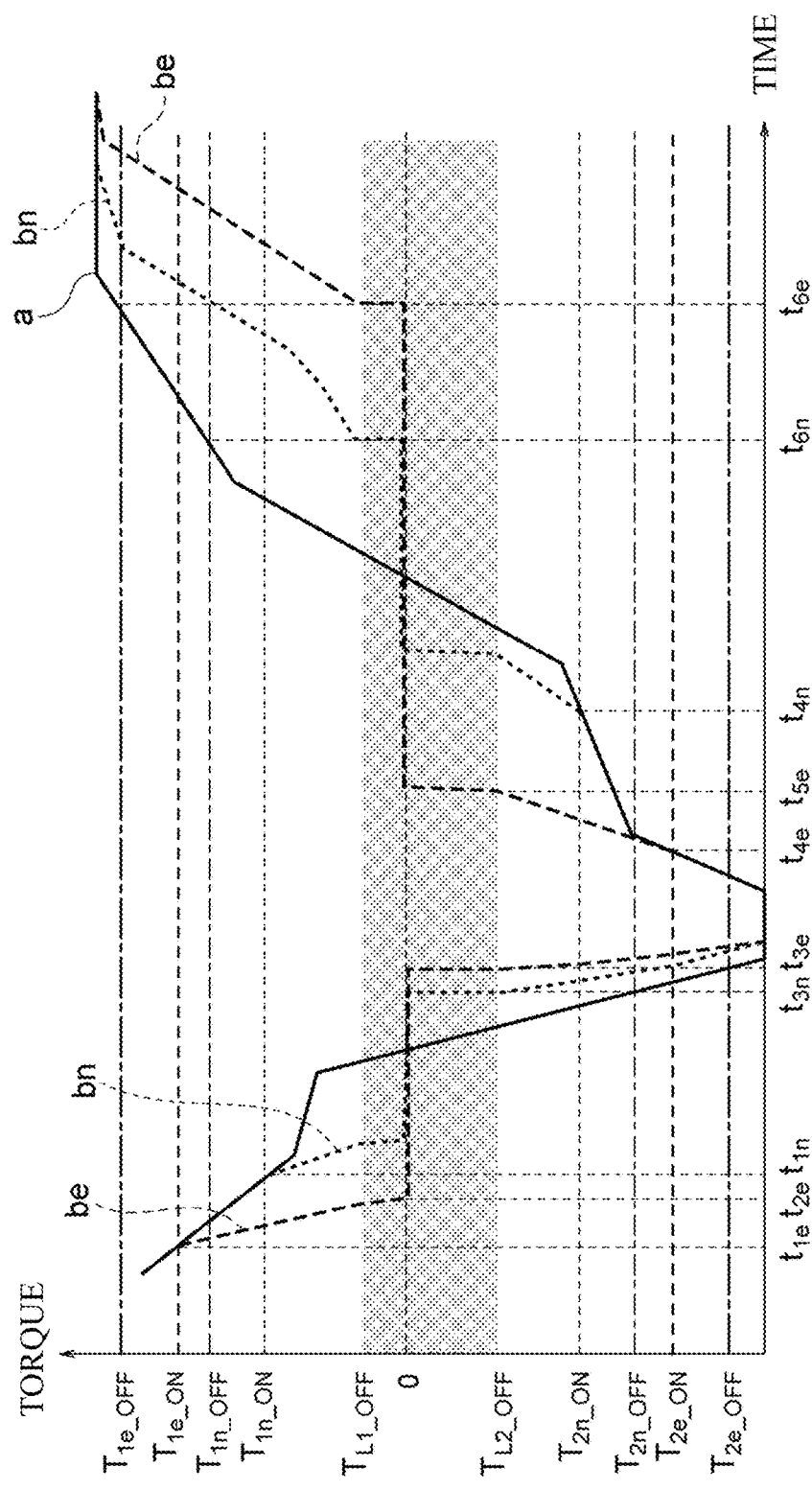
FIG. 9 is a graph illustrating torque characteristics of a regular mode and torque characteristics of an economy mode.

In the present embodiment, in order to improve energy consumption rate, the torque threshold values ($T_{1\_ON}$, $T_{1\_OFF}$, $T_{2\_ON}$, and $T_{2\_OFF}$) are switched according to the traveling mode. In the following, using torque characteristics of the regular mode and torque characteristics of the economy mode, switching control of the torque threshold value according to the traveling mode will be described. FIG. 8 is a graph illustrating torque characteristics of the regular mode. FIG. 9 is a graph illustrating torque characteristics of the regular mode and torque characteristics of the economy mode respectively. In FIG. 8, graph a indicates request torques calculated using the driving force map, and graph b indicates request torques for control. In FIG. 9, graph a indicates request torques calculated using the driving force map, graph $b_n$ shows request torques for control in the regular mode, and graph $b_e$ shows request torques for control in the economy mode.

To the memory 11, at least two types of torque threshold values ($T_{1\_ON}$) are stored. Also, at least two types of torque threshold values ($T_{1\_OFF}$), at least two types of torque threshold values ($T_{2\_ON}$), and at least two types of torque threshold values ($T_{2\_OFF}$) are stored in the memory 11 respectively. Between the two types of torque threshold values, one type of torque threshold values ($T_{1n\_ON}$, $T_{1n\_OFF}$, $T_{2n\_ON}$, and $T_{2n\_OFF}$) are the threshold values that are selected in the regular mode. Between the two types of torque threshold values, the other type of torque threshold values ($T_{1e\_ON}$, $T_{1e\_OFF}$, $T_{2e\_ON}$, and $T_{2e\_OFF}$) are the threshold values that are selected in the economy mode. The torque threshold value ($T_{1e\_ON}$) is greater than the torque threshold value ($T_{1n\_ON}$), and the torque threshold value ($T_{1e\_OFF}$) is greater than the torque threshold value ($T_{1n\_OFF}$). Also, the torque threshold value ($T_{2e\_ON}$) is greater than the torque threshold value ($T_{2n\_ON}$), and the torque threshold value ($T_{2e\_OFF}$) is greater than the torque threshold value ($T_{2n\_OFF}$).

When the traveling mode is in the regular mode, the vehicle controller 10 selects the torque threshold values ($T_{1n\_ON}$, $T_{1n\_OFF}$, $T_{2n\_ON}$, $T_{2n\_OFF}$) for the regular mode. When the traveling mode is the economy mode, the controller 10 selects the torque threshold values ($T_{1e\_ON}$, $T_{1e\_OFF}$, $T_{2e\_ON}$, and $T_{2e\_OFF}$) for the economy mode.

Suppose that the request torque from the driver changes with the characteristic as shown in graph a in FIG. 8 by accelerator operation when the traveling mode is in the regular mode.

At time tin, when the request torque from the driver becomes smaller than the torque threshold value ($T_{1n\_ON}$), the vehicle controller 10 switches the control mode of the power generator 3 from the ordinary mode to the coast traveling mode.

At time $t_{2n}$, when the request torque for control becomes smaller than the torque threshold value ($T_{L1\_OFF}$), the vehicle controller 10 releases the torque rate limit.

At time $t_{3n}$, when the request torque from the driver becomes greater than the torque threshold value ($T_{2n\_OFF}$), the vehicle controller 10 activates the torque-rate limit and switches the control mode of the power generator 3 from the coast traveling control to the ordinary control.

At time $t_{4n}$, when the request torque from the driver becomes smaller than the torque threshold value ($T_{2n\_ON}$), the vehicle controller 10 switches the control mode of the power generator 3 from the ordinary control to the coast traveling control.

At time $t_{5n}$, when the request torque for control becomes smaller than the torque threshold value ($T_{L2\_OFF}$), the vehicle controller 10 releases the torque-rate limit.

At time $t_{6n}$, when the request torque from the driver becomes greater than the torque threshold value ($T_{1n\_OFF}$), the vehicle controller activates the torque-rate limit and switches the control mode of the power generator 3 from the coast traveling control to the ordinary control.

The coast traveling time in the regular mode is the period between time $t_{2n}$ and time $t_{3n}$ and the period between time $t_{5n}$ and time $t_{6n}$ shown in FIG. 8.

Next, suppose that the request torque from the driver changes with the characteristic as shown in graph a in FIG. 9 by accelerator operation when the traveling mode is the economy mode. The characteristic of the request torque from the driver shown as graph a in FIG. 9 is the same as the characteristic shown as graph a of FIG. 8.

What is done for the control at each point between time $t_{1e}$ and time $t_{6e}$ is equal to what is done for the control at each point between time $t_{1n}$ and time $t_{6n}$. However, since the selecting torque threshold value varies between the economy mode and regular mode, timing for switching the control mode of the power generator 3 are different.

The torque threshold value ($T_{1e\_ON}$) of the economy mode is greater than the torque threshold value ($T_{1n\_ON}$) of the regular mode. Accordingly, the timing (time $t_{1e}$) of switching from the ordinary control to the coast traveling control in the economy mode during power running becomes earlier than the timing (time $t_{1n}$) for switching from the ordinary control to the coast traveling control in the regular mode.

The torque threshold value ($T_{2e\_OFF}$) of the economy mode is greater than the torque threshold value ($T_{2n\_OFF}$) of the regular mode. For this reason, in regeneration, the timing (time $t_{3e}$) for switching from the coast traveling control to the ordinary control in the economy mode comes later than the timing (time $t_{3n}$) for switching from the coast traveling control to the ordinary control in the regular mode. Accordingly, the length of coast traveling time in the economy mode becomes longer than the regular mode when switching from power running to regeneration.

More, the torque threshold value ($T_{2e\_ON}$) in the economy mode is greater than the torque threshold value ($T_{2n\_ON}$) in the regular mode. For this reason, in regeneration, the timing (time $t_{4e}$) for switching from the ordinary control to the coast traveling control in the economy mode comes earlier than the timing (time $t_{4n}$) for switching from the ordinary control to the coast traveling code in the regular mode.

The torque threshold value ($T_{1e\_OFF}$) in the economy mode is greater than the torque threshold value ($T_{1n\_OFF}$) in the regular mode. For this reason, during power running, the timing (time $t_{6e}$) switching from the coast traveling control to the ordinary control in the economy mode comes later than the timing (time $t_{6n}$) switching from the coast traveling control to the ordinary control in the regular mode. As a result, when switching from regeneration to power running, the length of coast traveling time in the economy mode becomes longer than the regular mode.

Further, when the sport mode is selected, because emphasis is put on operability of acceleration, the vehicle controller 10 prohibits the coast traveling control.

As described above, in the present embodiment, a request of speed control from the driver is detected using an accelerator-opening sensor 9, a request torque is calculated based on the state of the vehicle and detected request, and the torque generated at the power generator 3 is controlled based on the request torque. When the calculated request torque is smaller than the torque threshold values ($T_{1\_ON}$, $T_{2\_ON}$), the request torque is set to zero, and the power generator 3 is controlled based on the set request torque. When the power generator 3 is driven as requested by the driver, the coast traveling control is performed by setting the request torque for control to zero for the drive range in which driving efficiency is not satisfactory. In this way, inefficient drive of the power generator 3 can be suppressed and consequently, driving efficiency of the vehicle can be improved.

Further, in the present embodiment, the torque threshold value ($T_{1\_ON}$) when the rotation speed of the power generator 3 is greater than a predetermined value is greater than ($T_{1\_ON}$) when the rotation speed of the power generator 3 is smaller than the predetermined value. When the rotation speed of the power generator 3 is fast, driving efficiency becomes inferior compared to when the rotation speed of the power generator 3 is slow. For this reason, by increasing the torque threshold value ($T_{1\_ON}$) at the high-rotation side greater than the torque threshold value ($T_{1\_ON}$) at the low-rotation side, and by expanding the range for executing the coast traveling control for the high-rotation side, inefficient drive of the power generator 3 can be reduced.

Figure 10:
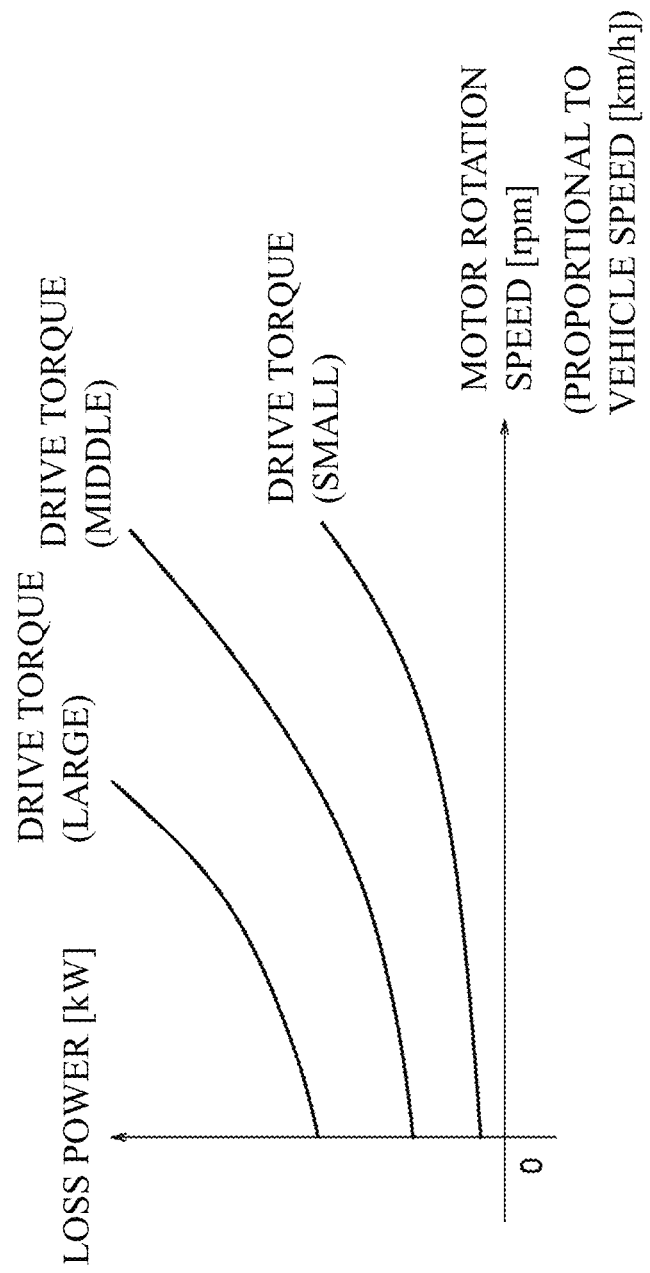
FIG. 10 is a graph illustrating characteristics of loss power relative to motor rotation speed.
Figure 11:
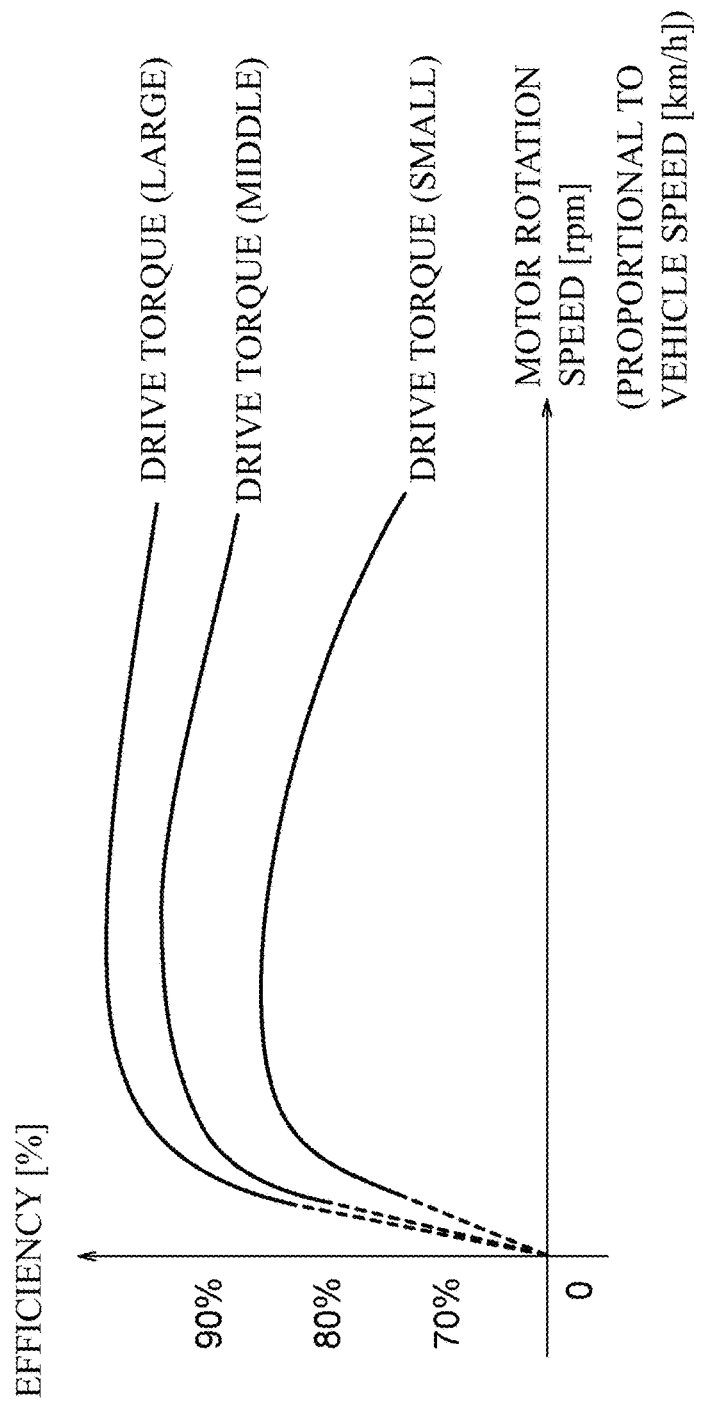
FIG. 11 is a graph illustrating characteristics of efficiency relative to motor rotation speed.

In the following, loss and efficiency of the power generator 3 will be described using FIG. 10 and FIG. 11. FIG. 10 is a graph illustrating characteristics of loss power relative to rotation speed of the power generator 3. FIG. 11 is a graph illustrating characteristics of efficiency relative to the rotation speed of the power generator 3. Each graph of FIG. 10 and FIG. 11 shows different characteristics depending on the magnitude of a constant drive torque.

As shown in FIG. 10, when the power generator 3 is driven at a certain carrier frequency, loss power increases proportionally to each of the rotation speed and drive torque. The loss of the power generator 3 is mainly a total of copper loss, iron loss, and mechanical loss. The copper loss is a loss caused by electric resistance (a wire wound resistor) of a copper wire used for winding wire of a coil. The iron loss is a loss caused by iron core of the coil and manly is the total of hysteresis loss and eddy current loss. The mechanical loss is the loss caused by friction and air resistance. Friction is generated at the bearing part by rotation of the power generator 3. Air resistance is the air resistance including the air resistance generated by the bearing of the rotor and rotation of the rotor.

When the torque is set stable, loss power increases in a quadratic curve relative to the rotation speed of the power generator 3. Whereas, when the torque is set stable, drive output of the power generator 3 increases proportionally to the rotation speed of the power generator 3. For this reason, as the rotation speed increases while making the torque stable, the amount of increase in the loss power becomes greater compared to the amount of increase in the drive output.

In other words, as shown in FIG. 11, efficiency of the drive state of the power generator 3 becomes bad when the speed is high (high rotation speed or high vehicle speed) and the torque is low. Also, when the rotation speed of the power generator 3 falls within the range between middle speed and high speed, counter-electromotive force is generated at the power generator 3. As a result, in order to output torque while suppressing the counter-electromotive force, a field-weakening control is required, and a loss by this field-weakening control also leads to lower efficiency.

In the present embodiment, the torque threshold value ($T_{1\_ON}$) of the high-rotation side is set to a value greater than the torque threshold value ($T_{1\_ON}$) of the low-rotation side as described above. In other words, in the drive range of the power generator, the torque threshold value is set so that an execution range for the coast traveling control becomes wider when the torque is low and rotation is high. In this way, the length of time of a state in which efficiency of the power generator 3 is bad can be shortened, and consequently, drive efficiency of the power generator 3 can be improved.

Further, in the present embodiment, the coast traveling control is executed when the rotation speed of the power generator 3 is greater than the predetermined rotation speed threshold value, however, the coast traveling control is not executed when the rotation speed of the power generator 3 is smaller than the predetermined rotation speed threshold value. The predetermined rotation speed threshold value is a value obtained by converting the lower-limit value ($V_L$) shown in FIG. 4 into rotation speed. Accordingly, for the drive range smaller than the rotation speed threshold value, an exact torque as requested can be generated at the power generator 3 when the request torque from the driver is small. In this way, in a situation in which small torque is often requested, the torque as requested by the driver can be output from the power generator 3.

Additionally, in the present embodiment, a torque change rate when the request torque changes from a state in which the request torque is smaller than the torque threshold values ($T_{1\_OFF}$ and $T_{2\_OFF}$) to a state in which the request torque is greater than the torque threshold values ($T_{1\_OFF}$ and $T_{2\_OFF}$) is set according to the magnitude of the request torque. In the present embodiment, a torque change rate when the request torque changes from a state in which the request torque is greater than the torque threshold values ($T_{1\_ON}$ and $T_{2\_ON}$) to a state in which the request torque is smaller than the torque threshold values ($T_{1\_ON}$ and $T_{2\_ON}$) is set according to the magnitude of the request torque. In other words, when switching the control mode between the coast traveling control and ordinary control, a torque change rate is set according to the magnitude of the request torque from the driver. When the request torque is small, a torque change accompanied by the change of the control mode can be suppressed. As a result, rapid change of the torque can be suppressed and natural and comfortable drive can be provided to the driver. Also, when the request torque is large, generation torque of the power generator 3 is changed with high responsiveness to the change in the request torque when changing the control mode. In this way, control for not generating delay in response to the accelerator operation can be achieved.

Also, in the present embodiment, a traveling mode is selected from a plurality of traveling modes, a torque threshold value is selected according to the traveling mode selected from the plurality of torque threshold values, and a coast traveling control is executed when the request torque is smaller than the selected torque threshold value. In this way, while coping with the traveling modes having different energy consumption rates, a toque threshold value that corresponds to the traveling mode can be set and thus driving efficiency of the vehicle can be improved.

More, as a modified example of the present embodiment, in order to prevent hunting of the control mode, the ordinary control may be switched to the coast traveling control when a state in which the request torque falls within the execution range of the coast traveling control continues for a certain period or more. Specifically, the vehicle controller 10 calculates a request torque from a driver using a drive map, and measures time when the calculated request torque becomes smaller than the torque threshold values ($T_{1\_ON}$ and $T_{2\_ON}$). The vehicle controller 10 continues the measurement when the state in which the calculated request torque is smaller than the torque threshold values ($T_{1\_ON}$ and $T_{2\_ON}$) continues. The vehicle controller 10 executes the coast traveling control when the measured time is the predetermined time threshold value or more. As a result, while accurately recognizing a traveling situation in which the request torque for control should be corrected by the coast traveling control, hunting can be prevented. Further, when a control for preventing hunting is to be performed because of the time described above, the values of the torque threshold values ($T_{1\_ON}$ and $T_{2\_ON}$) and torque threshold values ($T_{1\_OFF}$ and $T_{2\_OFF}$) can be the same or different.

DESCRIPTION OF REFERENCE NUMERALS

1 . . . drive wheel
2 . . . differential gear
3 . . . power generator (MG: motor)
4 . . . rotation speed sensor
5 . . . inverter
6 . . . battery
7 . . . motor controller
8 . . . battery controller
9 . . . accelerator-opening sensor
10 . . . vehicle controller
11 . . . memory

What is claimed is:

1. A torque control method for controlling torque of a motor, comprising:
    detecting request of speed control requested from a driver by using a sensor;
    calculating a request torque based on the request;
    controlling torque generated at the motor based on the request torque; and
    performing, when the request torque is smaller than a predetermined torque threshold value, a coast traveling control for setting the request torque to zero and controlling the motor based on the request torque which is set to zero,
    wherein the predetermined torque threshold value when rotation speed of the motor is greater than a first rotation speed threshold value, is greater than the predetermined torque threshold value when the rotation speed of the motor is smaller than the first rotation speed threshold value.

2. The torque control method according to claim 1, wherein the predetermined torque threshold value is lower than torque required to maintain a constant vehicle speed.

3. The torque control method according to claim 1, wherein
the predetermined torque threshold value is set to a constant value on the regeneration side.

4. The torque control method according to claim 1, wherein
the coast traveling control is executed when the rotation speed of the motor is greater than a second rotation speed threshold value, and
the coast traveling control is not executed when the rotation speed of the motor is smaller than the second rotation speed threshold value.

5. The torque control method according to claim 1, further comprising,
setting a torque change rate when the request torque is changed from a state in which the request torque is smaller than the predetermined torque threshold value to a state in which the request torque is greater than the predetermined torque threshold value, or the torque change rate when the request torque is changed from a state in which the request torque is greater than the predetermined torque threshold value to a state in which the request torque is smaller than the predetermined torque threshold value, according to the request torque.

6. The torque control method according to claim 1, wherein
the coast traveling control is executed when a state in which the request torque is smaller than the predetermined torque threshold value is continued for a certain period of time or more.

7. The torque control method according to claim 1, further comprising;
selecting a traveling mode of a vehicle including the motor from a plurality of traveling modes; and
selecting the predetermined torque threshold value from the plurality of the torque threshold values according to a selected traveling mode,
wherein the coast traveling control is executed when the request torque is smaller than the selected torque threshold value.

8. A torque control device, comprising:
an accelerator-opening sensor for detecting an accelerator opening;
a rotation speed sensor for detecting rotation speed of a motor;
a memory for storing a map indicating a relative relationship between torque of the motor, the rotation speed, and the accelerator opening; and
a controller for controlling the motor,
wherein, the controller
calculates the torque which corresponds to the accelerator opening and the rotation speed as a request torque from a driver while referencing the map,
controls the motor so that generation torque generated at the motor match with the request torque when the request torque is greater than a predetermined torque threshold value, and
controls the motor so that the generation torque becomes zero by setting the request torque to zero when the request torque is smaller than the predetermined torque threshold value, and
the predetermined torque threshold value when rotation speed of the motor is greater than a first rotation speed threshold value, is greater than the predetermined torque threshold value when the rotation speed of the motor is smaller than the first rotation speed threshold value.

* * * * *